Oct. 16, 1956  J. MARIAN  2,766,807
APPARATUS AND METHOD FOR MAKING A STRIP PRODUCT CAPABLE
OF BEING WOUND UP AND PROVIDED WITH ONE-FACED LAYER
OF CURED THERMOSETTING RESIN AND PRODUCT
Filed Sept. 14, 1953  2 Sheets-Sheet 1

Oct. 16, 1956  J. MARIAN  2,766,807
APPARATUS AND METHOD FOR MAKING A STRIP PRODUCT CAPABLE
OF BEING WOUND UP AND PROVIDED WITH ONE-FACED LAYER
OF CURED THERMOSETTING RESIN AND PRODUCT
Filed Sept. 14, 1953  2 Sheets-Sheet 2

United States Patent Office 2,766,807
Patented Oct. 16, 1956

2,766,807

APPARATUS AND METHOD FOR MAKING A STRIP PRODUCT CAPABLE OF BEING WOUND UP AND PROVIDED WITH ONE-FACED LAYER OF CURED THERMOSETTING RESIN AND PRODUCT

Josef Marian, Saltsjobaden, Sweden

Application September 14, 1953, Serial No. 379,927

Claims priority, application Sweden September 12, 1952

27 Claims. (Cl. 154—37)

My invention relates to strip products having on the one face a very hard, grease, water and abrasion resistant, layer of a thermo-setting condensation resin and on the opposite face a layer poor in resin permitting sizing of the product onto a support.

More particularly my invention relates to laminated strip products capable of being wound up and having on the one preferably decorated face a very hard grease, water and abrasion resistant layer of a cured condensation resin such as a urea-aldehyde resin and on the opposite face a layer poor in resin permitting gluing of the product onto a supporting surface.

Products manufactured according to my invention are well adapted for use as a decorated surface coating for tables, desks, walls, partitions, and numerous other structures and articles.

Thin sheet products impregnated by artificial resins in different layers presenting different degrees of impregnation are known in prior art. Laminated strip products capable of being wound up are known as far as they are made with polyester resins or mixtures thereof with melamine resins as impregnating agents. Such products are manufactured by impregnating a porous absorptive strip of a suitable carrier material, drying the impregnated strip and hardening the resin. The hardening is performed without application of pressure. It is also known in prior art to manufacture multi-layer sheet material with thermoplastic resins as impregnating agent. The manufacture comprises the steps of impregnating suitable absorptive strips, drying the combined strips and cooling the strip unit. In this process the cooling operation represents the hardening of the resin.

Sheet products capable of being wound either as individual rolls or continuously, comprising a preferably decorated face covered by a hard layer of a thermosetting condensation resin have not heretofore been manufactured. Known laminated products covered by or composed of sheets of which at least part is impregnated with a thermosetting condensation resin are so rigid and fragile as to be incapable of being wound up. The products of this type used in practice are relatively thick, as it was generally believed that their fragility ought to be compensated by considerable thickness of the stiff strip unit. Thin laminates of this type were believed to be worthless for practical purposes because of their absence of pliability. They were further presumed to afford intricate difficulties in manipulation for example with regard to cutting to required dimensions, transport, etc., because of the fragility and brittleness inherent in them.

Still less they were assumed to be suited for manufacture in a continuous process combining continuous impregnation of one or a plurality of suitable absorptive carrier strips with a thermosetting condensation resin, combining the impregnated strips with one another and possibly with one or several non-impregnated ones, drying the combined strip unit and curing the impregnating resin agent subsequently so as to obtain a continuous laminated product with a preferably decorated surface covered by a hard layer of the cured resin which product is then capable of being wound to rolls of desired size. As thermosetting condensation resins must be cured under pressure in order to obtain the desired smooth resin layer on the surface of the unitary strip, and the magnitude of said pressure according to earlier experience ought to be not less than 20 kilograms per square centimeter, it was believed impossible to operate with resilient pressure means, such as a tensioned heated band pressing on the strips passing continuously over a heated cylindrical drum, which is the only means that can be used in a continuously operating curing device.

One object of my invention is to provide a method and means for manufacturing thin laminated sheet products capable of being wound up and provided on one face with a layer of a cured thermosetting condensation resin free from fissures and in spite of large surface size easy to handle, and to cut and to glue such products on a support surface to be covered. I have discovered that by commencing the drying operation with a heated laminated strip unit, a considerably minor pressure power is required to obtain a product with a perfectly cured resin coating. Due to its compressibility the layer poor in resin underneath said surface layer acts as a cushion in the curing operation under pressure. The reduction of the pressure force required permits the curing operation to be performed on a cylindrical drum cooperating with movable resilient pressure means. The reduction of the pressure power further permits an increase of the curing velocity. The cured strip unit has surprisingly proved to be pliable, when still heated, subsequent to the curing operation. This phenomen makes it possible to maintain flexibility even after the cured product has cooled to room temperature, said flexibility being sufficient for the use of the final product for all purposes mentioned above.

A further object of my invention is to provide a method which by utilizing the discoveries set forth permits the manufacture of the flexible strip unit in a continuous working process comprising impregnation of at least one absorptive carrier strip with the thermosetting condensation resin, combining face to face said impregnated strip with at least one less impregnated absorptive strip, drying said strip unit and curing the thermosetting condensation resin without any interruption between the different steps of said process.

A still further object of my invention is to provide a machine for carrying through said continuous working process.

Further objects and advantages of my invention will be apparent from the following description of a preferred manner of putting my invention into practice described in connection with the representative machine illustrated in the accompanying drawings which form part of this specification and of which:

Figure 1:
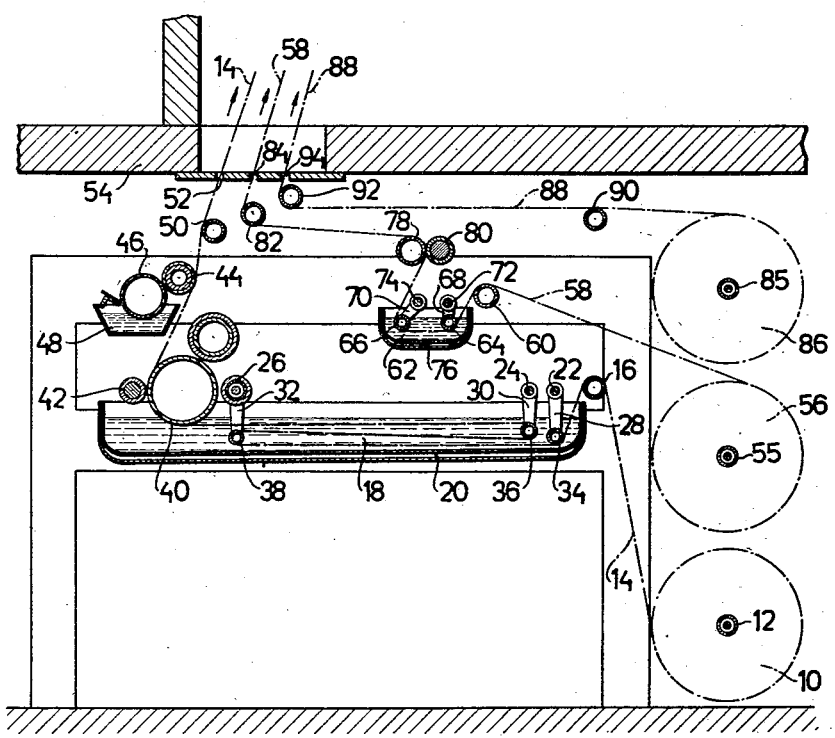
Fig. 1 is a diagrammatic vertical sectional view of the lower part of a machine that may be employed in carrying my invention into effect.

The machine shown in the drawings as a preferred embodiment for carrying out the method of my invention has a spindle 12 carrying a roll 10 of a strip of absorptive paper, for example alpha cellulose paper having a decorative surface, i. e. a colored design printed thereon, the opposite surface of the paper strip being smooth. The thickness of the paper, which may contain 20% of a pigment, may correspond to a weight of 150 to 200 grams per square meter, and I prefer a weight of about 160 grams per square meter. The paper has a high suction capacity, preferably amounting to 10 mm./min. and 30 mm./5 min. according to British Standard Specification 698. The strip 14 unrolled from the roll 10 on the spindle 12 is guided over an adjustable roller 16 down into a vessel 18 containing an impregnating liquid preferably consisting of an aqueous solution of a curable condensation resin such as a urea aldehyde resin.

A suitable impregnating liquid is prepared by intermixing 80 parts by weight of urea, 200 parts by weight of formaline (having a concentration of 37%) and such a quantity of NaOH as to adjust the pH to about 4.5. This mixture is boiled under pressure in a closed vessel for about 2 hours until the viscosity reaches about 50 cps. The condensation product is then allowed to cool to room temperature whereupon it is neutralized by additional NaOH to a pH of 7.0. To this reaction mixture, 6 parts by weight of oxalic acid dissolved in a negligible quantity of water and acting as catalyst are added under stirring.

The vessel 18 may be double-walled and have an interspace 20 adapted to be passed by a medium capable of adjusting the temperature of the impregnation liquid to predetermined value above or below the ambient temperature.

Horizontally displaceable shafts 22, 24, and 26 disposed above the vessel 18 have arms 28, 30 and 32, respectively, extending therefrom down into the vessel and supporting therein submerging rollers 34, 36, and 38, respectively, about which the strip 14 is guided below the surface of the impregnating liquid in the vessel 18. The strip 14 impregnated with liquid is guided upwardly over a roller 40 against which abuts a scraping roller 42 micrometrically adjustable relative said guide roller 40 for control of the quantity of liquid adhering to the strip.

The strip 14 on its further path upwardly is guided over a locally stationary roller 44 to be in contact therewith by its decorated face onto which said roller delivers a lacquer liquid supplied to said roller 44 by another roller 46 partially immersed in such lacquer liquid contained in the vessel 48, which may be an aqueous solution of a pure melaminealdehyde resin (of the type melamine M. 105) having a concentration of about 30%. The quantity of lacquer liquid is preferably adjusted to about 30 grams per square meter.

The impregnation part of the machine is preferably located on a lower floor of a factory, from which floor the impregnated strip 14 is guided upwardly over a guide roll 50 and through a narrow aperture 52 in the entablement 54 to the upper floor.

The machine illustrated is constructed so as to permit to unite the strip 14 upon impregnation first with a strip of metal preferably aluminum which continuously is unrolled from a roll 56 carried by a spindle 55. The metal strip 58 is guided over a guide roller 60 down into a vessel 62 into which descend rollers 64 and 66 mounted on arms 68 and 70, respectively, carried by horizontally displaceable shafts 72 and 74, respectively, located above said vessel. This latter which preferably is also double-walled and has an interspace 76 for passage of a medium adapted to adjust the contents of the vessel to a predetermined temperature, contains a gluing liquid, preferably constituted by an emulsion of a polyvinyl chloride acetate in water of the Movicol type having a content of solid material of 50%. This gluing liquid is applied to both faces of the strip in a quantity of 40 grams per square meter calculated for both faces together. Excess of said liquid is removed when the strip passes between two rollers 78 and 80 adjustable relative one another. The metal strip 58 which may have a thickness of the order of magnitude of 0.1 millimeters is then guided in an upward direction over a roller 82 and through a narrow aperture 84 to the upper floor above the entablement 54.

The machine illustrated in the drawings is further constructed to deliver from a further roll 86 of absorptive paper carried by a spindle 85 a strip 88 which is unrolled continuously and guided over rollers 90 and 92 and through a narrow aperture 94 in the entablement 54 into the upper part of the machine. The strip 88 which is not impregnated is intended as a binding layer for the fastening of the finished unitary multi-strip product to the support surface to be covered.

Figure 2:
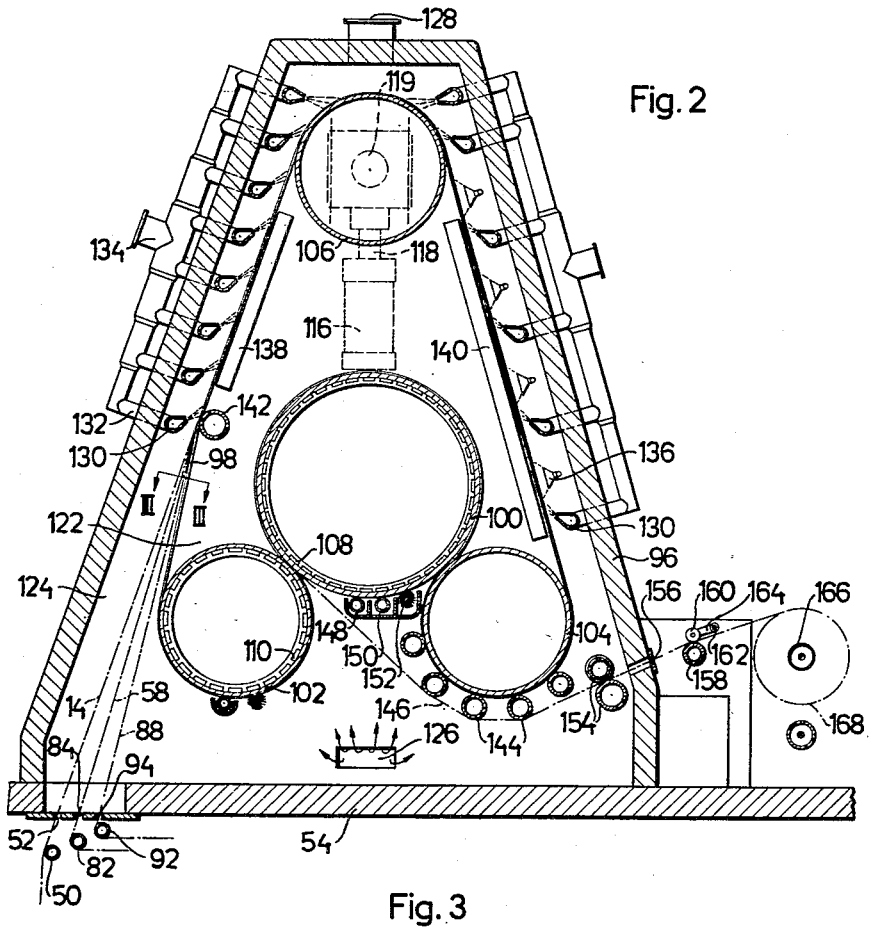
Fig. 2 is a diagrammatic vertical sectional view of the upper part of the machine.
Figure 3:
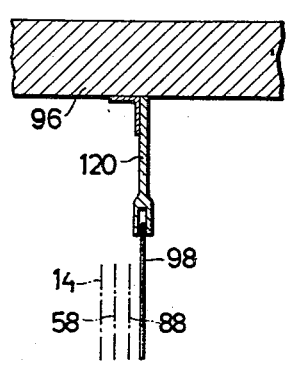
Fig. 3 is a section taken on line III—III of Fig. 2.

The upper part of the machine comprising a combined drying and curing chamber is enclosed by a heat insulated casing 96 suitably tapering in the upward direction, as will be seen from Fig. 2. Within this casing, an endless band 98, for example a steel band or a band combined of steel wires and rubber, which may be gas-permeable, is disposed to pass over a larger cylindrical drum 100 and three minor cylindrical drums 102, 104 and 106, of which the drum 104 may be driven from any suitable source of power not shown and the other drums may be imparted rotation by the band 98 which in turn is imparted traction by the drum 104. Heating members 108 and 110, which may be heated by electricity, are disposed to extend axially along the inner face of the mantle of the cylindrical drums 100 and 102. The band 98 is kept stretched between the cylinders by means of two hydraulic pressure members each of which comprises a stationary cylinder 116 and a displaceable piston 118 and is located outside the casing 96 where the piston is arranged to cooperate with one of the two axle journals 119 of the drum 106. The band 98, which is heated by contact with the heated drums 100 and 102, extends perpendicularly to the section plane of Fig. 2 through the total width of the drying and curing chamber. Each edge of the band is preferably encased between sealing lists 120 secured to the casing 96, as is illustrated in Fig. 3. In this way the chamber is divided by the band 98 into an inner space 122 and an outer space 124.

Heat is supplied to the space 124 suitably at the bottom through an inlet opening 126 for hot air escaping from said room at the top thereof through a discharge opening 128. Outside the straight portions of the band 98, there is disposed a series of nozzles 130 each of which by a branch tube 132 is connected to a common inlet socket 134 for hot air. The nozzles 130 are suitably constructed so as to impart to the stream of hot air escaping therefrom a direction such as to meet the strips supported by the band at an oblique angle. The right portion of the space 124 as presented in Fig. 2 may further be provided with devices 136 adapted to emit infra-red rays against the strips passing with the band 98. The temperature in the drying chamber is kept considerably above the boiling point of the solvent, for example the water, in order to perform the drying operation during the relatively short space of time of the passage of the strips through the drying portion of the machine. In order to speed up the drying rate heating elements 138 suitably operated by electricity may be disposed adjacent the interior face of the band 98 along the straight portions thereof.

The three strips 14, 58 and 88 of which the two first mentioned ones have been impregnated or provided with a cover of an adhesive, respectively, in the manner described above, and the last mentioned one, which is not impregnated or coated, preferably is a little broader than the other two, are fed along a relatively long path separated from one another in order to be heated individually and to start evaporation of the solvent adhering to one or the other of them. A roller 142 abuts against the band 98 and imparts to the straight part of the band extending between the drums 102 and 106 a slight outward bulge so as to cause the strips to come into face to face contact with one another and the band only after having transgressed a relatively large portion of the chamber in an upward direction while thereunder successively approaching said band. This feature causes the drying to set in slowly and also the individual strips to combine with a minimum of air bubbles and similar defects included therebetween. The drying of the strips is continued on the band 98, the solvents for the different applied liquids escaping in a vaporous state. The adhesive liquid applied onto the metal strip 58, if such a one is present, penetrates into the strip 88 so as to cause these strips to stick together simultaneously with their drying. The action is the same as far as the strip 14 and the other face of the metal strip 58 are concerned. The solvent vapors escape together with the hot air passing the space 124, through the outlet opening 128. Other solvents than water contained in the impregnating or adhesive liquids may be recovered in a manner known per se. The strips abutting face to face and resting on the band are guided under the drying operation initially upwardly, thereupon over the drum 106 where the direction is turned downwardly in which direction the band advances to the drum 104. Thereby the non-impregnated broader strip 88 protects the band 98 from becoming soiled by resin and takes up the major part of the interior stresses in the strip unit which results in minimizing the danger of rupture. During their passage over the drum 104 the strips may be subjected to the pressure of a plurality of minor rollers 144 the purpose of which is to smooth and plane the lacquer layer on the decorative surface and to eliminate possible defects and cavities which nevertheless may exist in the now cohering strip unit. This strip unit which is dried to a moisture content of between 1 and 10, preferably about 3%, then enters between the band 98 and the curing drum 100 exposing said unit to a successively increasing pressure until the unit reaches the top line of the drum whereupon the pressure decreases successively until the strip unit designated by 146 leaves the band 98. The continuous pressure exerted on the strip unit with its relatively slow increase and decrease in intensity is of considerable importance for ensuring the curing of the resins under the most favorable conditions. Because of the feature that the drying and the curing processes immediately pass over from one to the other, the resin maintains, even if the curing has commenced ahead of the drum 100, a relatively great flow which permits keeping the press power at a substantially lower value than was possible with curing machines and devices known in prior art. A pressure power of 5 kilograms per square centimeter has proved to be sufficient. A pressure power of this magnitude is possible to be maintained with moderate dimensions of the drums and the band. This feature contributes in reducing the total length of the endless band and consequently the height of the drying and curing chamber and in particular that of the portion of said chamber occupied by the members participating in the curing operation.

Against the drum 100 abut from below three rollers 148, 150 and 152 which are driven individually and located each in its individual casing. The first mentioned roller is immersed in a bath of liquid cleansing agent and wets the drum with said liquid agent. The roller 150 is disposed to scrub or wash the drum while the roller 152 has for its object to brush off particles adhering to the drum so as to ensure that the drum always is clean and smooth when coming into contact with the strip unit.

The temperature in the space 124, in which a partial vacuum is preferred, is suitably kept at about 140° C., thus relatively much over the boiling point of the solvents which in the present embodiment are principally aqueous water. In the interior space 122 and particularly between the band 98 and the drum 100 the temperature is preferably kept somewhat lower, for example at about 120° C. The band 98 is driven with a speed of between 1 and 5, preferably between 3 and 4 meters per minute depending on the properties of the resin or resins employed. With the preferred speed the impregnating operation is performed within a time of between 20 and 40 seconds and the drying operation within a time of about 2 minutes, the length of the drying path being assumed to be about 6 meters. The curing operation is performed during a correspondingly shorter time as will be understood from Fig. 2.

The strip unit 146 may then be guided over several of the rollers 144 and thereupon be pressed between two smoothing rollers 154. The strip unit leaves the casing 96 through a narrow opening 156. Upon equalizing of the borders of the strip unit by a cutting operation by means of a roller 158 and a circular cutting device 160 carried by an arm 164 turnable on a journal bearing 162, the strip unit while still heated is wound on a spindle 166 so as to form a roll 168 in which the face of the strip unit decorated with the colored design and provided with the cured thermosetting resin is the exterior one. This winding up of the strip unit when still hot immediately upon the combining of the individual strips and the curing of the thermosetting resin is an essential feature of the method according to my invention and of the machine for carrying through the preferred manner of carrying out the method. After having been wound up the strip unit is allowed to cool to room temperature. During this cooling step an initial tension or prestress is produced in the resin layer which results in the novel effect that the strip unit when unrolled will straighten automatically to a more or less extent due to a more or less complete release of said initial tension or prestress. This straightening has proved to eliminate any fissuring in the resin layer and thus to improve the decorative surface of the strip when applying the same unit to the support surface to be coated. The straightening effect is improved by wetting the back face of the strip unit with liquid adhesive which is the usual procedure in preparing the unit for its fastening to the support surface, since by the liquid adhesive the back layer is caused to swell.

The method according to my invention may also be carried through intermittently. In particular when existing apparatus is to be used, it may be appropriate to perform the impregnating, combining and drying steps separately from the curing step. In this case it is, however indispensable to provide measures ensuring that the superimposed strips are introduced into the curing apparatus in a preheated condition. This may be achieved in different ways. The most simple is to heat a dry strip unit either resin impregnated on one face only or composed of a thoroughly resin impregnated sheet and a more or less resin impregnated sheet immediately prior to its introduction into the pressure device which in this case may be a flat press with heated press platens, by exposing said unit to the influence of a source of heat, such as a device emitting infra red rays or electrodes for inductive heating. It is also conceivable to enclose the dried strip unit, when heated by the drying heat, in a heat insulated transportable casing and to convey it when still warm to the curing apparatus into which the unit is fed before it has had time to cool. Whatever curing device may be used, it is indispensable, in order to attain the effect of the invention, to wind the cured strip unit when still hot into a roll having the face rich in resin as the exterior face. When using a flat press, it is only possible to cure individual units of superimposed sheets of a size not exceeding that of the press platens. The cured units may be wound into individual rolls which are to be kept wound up at least for the time when the rolls cool to room temperature. It is also possible to unite end to end a plurality of individually cured units, for example by tapes or similar provisional connecting means, and to wind a plurality into one roll which is kept in the wound-up condition at least until it has reached room temperature.

Though the described combination of three strips, of which one is a sheet of paper, fabric or a similar porous material preferably provided with a decorative surface and impregnated with a thermosetting resin, such as a urea aldehyde resin or a melamine aldehyde resin or a mixture of said two resin types, a further consists of a thin metal strip covered on at least one face with a liquid resin and intended to constitute a heat conducting barrier, and a third is a non-impregnated backing sheet permitting the fastening of the strip unit to the surface to be coated, constitutes the preferred embodiment, the intermediate barrier strip may be omitted, if no heat conduction is required. It is also conceivable to employ one porous strip only which on one face is coated with so large a quantity of a thermosetting resin as to cause the resin to penetrate into but not entirely through the strip so as to present an impregnation with resin, the concentration of which is successively reduced in the direction from one face toward the opposite face which is substantially free from resin. I prefer, however, to combine at least two strips, since the impregnated sheet rich in resin during the drying and curing steps shrinks more than the non-impregnated backing sheet. As the first mentioned strip is the exterior one, both in the machine and in particular when winding the hot cured unit into a roll, a creaseless face to face abutment of the strips is ensured.

The figures given in the above description of the preferred manner of carrying the method according to my invention into effect on the machine devised by me may be varied in accordance with the requirements and desired properties of the finished products. The paper strip intended to constitute the decorative surface protected by the thermosetting resin may be a sulfate paper weighing between 40 and 250 and most preferably between 150 and 200 grams per square meter. Its suction capacity according to British Standard Specification 698 may vary from 2 to 20 mm./min. and from 10 to 50 mm./5 min. Its pigment content may be kept between 10 and 30% by weight. The additional coating of the thoroughly impregnated paper on its external face may be performed with a quantity of resin varying between 10 and 100 grams per square meter.

The polyvinyl acetate resin may be intermixed with urea or phenol aldehyde resins. The aluminum strip may be a little thicker or thinner than 0.1 millimeter. The backing paper may also be of bleached kraft paper weighing between 80 and 250 grams per square meter.

The drying operation preceding the curing under pressure and heat should be performed so as to impart to the resin optimum flow with a minimum of water present. Too little flow manifests itself in the resin surface coating the design not becoming even and smooth, while too great flow causes bleeding through the entire strip unit visible on the face of the backing strip. The flow is easily adjustable by varying the condensation degree of the impregnating resin liquid, the drying temperature, or the catalyst present in the liquid, or by addition of plasticisers.

The curing may be speeded up by radiation with infra red rays. This expedient is of particular value in cases where the laminated product contains relatively slowly curing resins.

While my invention has been described in detail by the preferred manner of putting it into effect by means of a machine embodying certain valuable features of my invention, it is to be understood that my invention is not to be limited thereby, as it will be apparent to those skilled in the art that the invention may be varied in various ways over the modifications indicated above within the scope and the spirit of the appended claims.

What I claim is:

1. The method of manufacturing sheet material having on one face a hard, grease, water, and abrasion resistant layer of a transparent thermosetting condensation resin and on the opposite face an absorptive surface, comprising the steps of coating one face of absorptive sheet material with a water-soluble thermosetting condensation resin in liquid state, drying the impregnated sheet material at a temperature substantially over the boiling point of the solvent for the resin to a moisture content of between 1 and 10%, curing the resin by subjecting the dried sheet material to heat and substantial pressure simultaneously for a length of time sufficient to cure the resin to the C-stage, and immediately winding the cured sheet material into a roll with the layer of cured resin facing outwardly.

2. The method of claim 1 in which the curing step includes the use of uniform pressure.

3. The method of claim 1 in which the curing step includes subjecting the dried sheet material to heat of between 110 and 130° C., and in which the pressure is uniform and between not substantially below 5 nor substantially above 10 kilograms per square centimeter.

4. The method of claim 1 in which the curing step includes subjecting the dried sheet material to a temperature of approximately 120° C. and to uniform pressure of approximately 5 kilograms per square centimeter.

5. The method of claim 1 in which the drying step includes drying the impregnated sheet material at a temperature substantially over the boiling point of the solvent for the resin to a moisture content of approximately 3%.

6. The method of claim 1 in which the drying step is carried out at a temperature of approximately 140° C. and the moisture content is brought to about 3%.

7. The method of claim 1 in which the drying step is carried out in a vacuum at a temperature of about 140° C. to a moisture content of approximately 3%, and the curing step includes subjecting the dried sheet material to a temperature of approximately 120° C. and uniform pressure of approximately 5 kilograms per square centimeter.

8. The method of manufacturing laminated sheet material having on one face a sheet impregnated with a thermosetting condensation resin forming upon curing to the C-stage a transparent, hard, grease, water, and abrasion resistant coating and on its opposite face an absorptive sheet poor in resin and permitting gluing of the product onto a surface, comprising the steps of impregnating a sheet of absorptive paper with a water-soluble thermosetting condensation resin in liquid state, combining the impregnated sheet face to face with a non-impregnated strip of absorptive paper, drying the superimposed sheets at a temperature substantially over the boiling point of the solvent for the resin to a moisture content of between 1 and 10%, curing the resin by subjecting the dried sheet material to heat and substantial pressure simultaneously for a length of time sufficient to cure the resin to the C-stage, and immediately winding the sheet material into a roll with the sheet initially impregnated with the resin subsequently cured facing outwardly.

9. The method of claim 8 in which the curing step includes subjecting the dried sheet material to uniform substantial pressure.

10. The method of claim 8 in which the curing step includes subjecting the dried sheet material to a temperature of between 110 and 130° C. and to uniform substantial pressure of between not substantially below 5 nor over 10 kilograms per square centimeter.

11. The method of claim 8 in which the curing step includes subjecting the dried sheet material to a temperature of approximately 120° C. and uniform pressure of approximately 5 kilograms per square centimeter.

12. The method of claim 8 in which the drying step includes drying to a moisture content of approximately 3%.

13. The method of claim 8 in which the drying step is carried out at a temperature of approximately 140° C.

14. The method of claim 8 in which the drying step is carried out in a partial vacuum at a temperature of approximately 140° C. to a moisture content of approximately 3%, and the curing step includes subjecting the dried sheet material to a temperature of approximately 120° C. and uniform pressure of approximately 5 kilograms per square centimeter.

15. The method of manufacturing in a continuous process a laminated strip product having on its one face a strip impregnated with a thermosetting condensation resin forming upon curing to the C-stage a transparent, hard, grease, water and abrasion resistant coating and on its opposite face an absorptive strip poor in resin and permitting gluing of the product onto a surface, comprising the steps of continuously impregnating a strip of absorptive paper unrolled from a supply roll with a water-soluble thermosetting condensation resin in liquid state and of such nature as upon curing to be transparent, combining the impregnated strip continuously and face to face with a non-impregnated strip of absorptive paper unrolled from a supply roll, drying the strip product thus obtained by passing it through a drying chamber sealed off against the outer atmosphere so as to allow maintenance of a drying temperature substantially over the boiling point of the solvent for the resin, with a speed permitting reduction of the moisture content of the impregnated sheet to be reduced to between 1 and 10% when being discharged from said drying chamber, continuously introducing the dried product while still hot into a pressure device comprising a heated curved surface and a heated resilient pressure member both adapted to be carried along by said dried product so as to keep said product subjected to heat and uniform substantial pressure simultaneously for a length of time sufficiently to cure the resin to the C-stage, continuously removing the product from said pressure device and immediately winding it into a roll with the resin impregnated strip located as the exterior lamination.

16. The method of claim 15 in which the curing step includes subjecting the product to a temperature of between 110 and 130° C. and pressure of between not substantially below 5 nor over 10 kilograms per square centimeter.

17. The method of claim 15 in which the curing step includes subjecting the product to a temperature of approximately 120° C. and pressure of approximately 5 kilograms per square centimeter.

18. The method of claim 15 in which the drying step permits reduction of the moisture content of the impregnated sheet to approximately 3%.

19. The method of claim 15 in which the drying step includes passing it through a drying chamber having a drying temperature of approximately 140° C.

20. The method of claim 15 in which the drying step includes passing the strip product through a drying chamber in which a partial vacuum is maintained and at a drying temperature of approximately 140° C. at a speed permitting reduction of the moisture content of the impregnated sheet to approximately 3%, and the curing step includes subjecting the product to a temperature of approximately 120° C. under pressure of approximately 5 kilograms per square centimeter.

21. A laminated sheet material product having on one face a hard, grease, water, and abrasion resistant layer of a thermosetting condensation resin cured to the C-stage and on the opposite face an absorptive surface, said product being curved with the absorptive surface on its concave side and the layer of cured resin on its convex side, said product being sufficiently flexible to permit it to be flattened without cracking of the resin.

22. A laminated sheet material product having on one face a hard, grease, water and abrasion resistant layer of a thermosetting condensation resin cured to the C-stage and on the opposite face an absorptive surface, said product being sufficiently flexible to permit substantial bending without cracking of the resin.

23. A machine for continuous manufacture of a laminated sheet product capable of being wound into a roll and composed of a plurality of paper strips, one face strip constituting a carrier for a hard, grease, water, and abrasion resistant layer of a thermosetting condensation resin and the opposite face strip constituting an absorptive surface, said machine comprising a heat insulated casing, a large heated rotatable drum and a plurality of smaller rotatable drums located within said casing on different levels, said large drum occupying a central relative to said smaller drums, means to drive at least one of said smaller drums, an endless band stretched between said smaller drums along a travel course directed up and down within said casing and over a substantially minor portion of said course kept pressed against said large drum so as to force said drum to a rotation with a speed equaling the travel speed of said band imparted to said band by said smaller drum receiving driving power, means to divide said casing into separate spaces, means to heat at least the large one of said rotatable drums, means to supply heat to at least one of said spaces in said casing from other source of heat than the heated drum, means to guide the individual strips to be combined to said laminated sheet product separated from one another through a minor portion of said heated space forming a drying chamber, means to combine the individual strips to a strip unit placed on and carried along by said band past said heat supplying means in said drying chamber and thereafter between said band and said large drum forming a heated pressing device with a resilient press member and pressing surfaces following the unit under its travel through said device and acting as continuously operating curing device so as to have both drying and curing of the condensation resin performed while the unit is carried by said band, means continuously to remove said unit from said band and means continuously to convey said unit out of said casing.

24. A machine as claimed in claim 23, and means to continuously wind said unit into a roll outside of said casing.

25. A machine as claimed in claim 23, said casing dividing means dividing said casing into two separate spaces one inside the other, said heat supplying means supplying heat to at least the outer of said spaces in said casing.

26. A machine as claimed in claim 23, said means to divide said casing into separate spaces comprising means to seal the lateral edges of said endless band against the wall of said casing so as to divide said casing into two separate spaces located one inside the other, said means to supply heat supplying heat to at least the outer of said spaces in said casing.

27. A machine as claimed in claim 23, said drying chamber containing a guide roller located so as to create a slight outwardly directed bulge in the straight part of the endless band moving upwardly between said drums so as to produce an acute angle between said band and the individual strips.

References Cited in the file of this patent

UNITED STATES PATENTS

| Number | Name | Date |
|---|---|---|
| 1,887,691 | Loetscher | Nov. 15, 1932 |
| 2,227,494 | Gold | Jan. 7, 1941 |
| 2,306,295 | Casto | Dec. 22, 1942 |
| 2,334,485 | Ettl | Nov. 16, 1943 |
| 2,359,314 | Klein et al. | Oct. 3, 1944 |
| 2,434,795 | Glasing et al. | Jan. 20, 1948 |
| 2,448,357 | Craig et al. | Aug. 31, 1948 |
| 2,496,122 | Donahue | Jan. 31, 1950 |
| 2,496,911 | Green | Feb. 7, 1950 |
| 2,528,152 | Landgraf | Oct. 31, 1950 |
| 2,528,168 | Paulsen | Oct. 31, 1950 |
| 2,554,150 | Moore | May 22, 1951 |
| 2,568,463 | Reynolds | Sept. 18, 1951 |
| 2,579,949 | Minnear | Dec. 25, 1951 |
| 2,584,177 | Wohnsiedler et al. | Feb. 5, 1952 |
| 2,587,171 | Knewstubb et al. | Feb. 26, 1952 |
| 2,640,799 | Grangaard | June 2, 1953 |
| 2,665,221 | Grangaard | Jan. 5, 1954 |

FOREIGN PATENTS

| 391,941 | Great Britain | May 11, 1933 |